March 24, 1970 A. NEWTON 3,502,987

ANALOG FEEDBACK IMPLEMENTATION OF GAUSSIAN MODULATED SIGNALS

Filed June 6, 1967 2 Sheets-Sheet 1

INVENTOR,
ARNOLD NEWTON.
BY Harry M. Saragovitz
Edward J. Kelly, Herbert Berl
& Julian C. Keppler
ATTORNEYS ANALOG FEEDBACK IMPLEMENTATION OF GAUSSIAN MODULATED SIGNALS
Filed June 6, 1967 2 Sheets-Sheet 2
FIG. 5
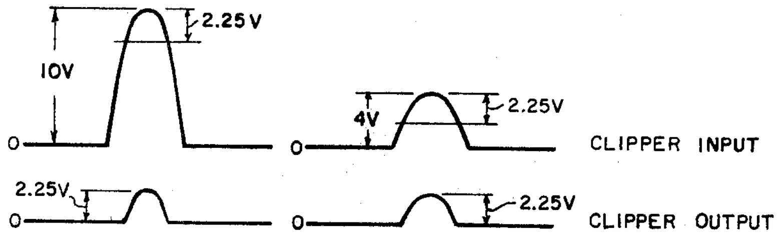
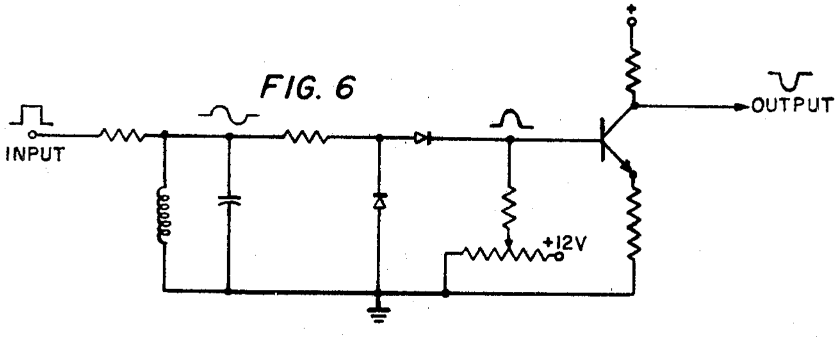
FIG. 7
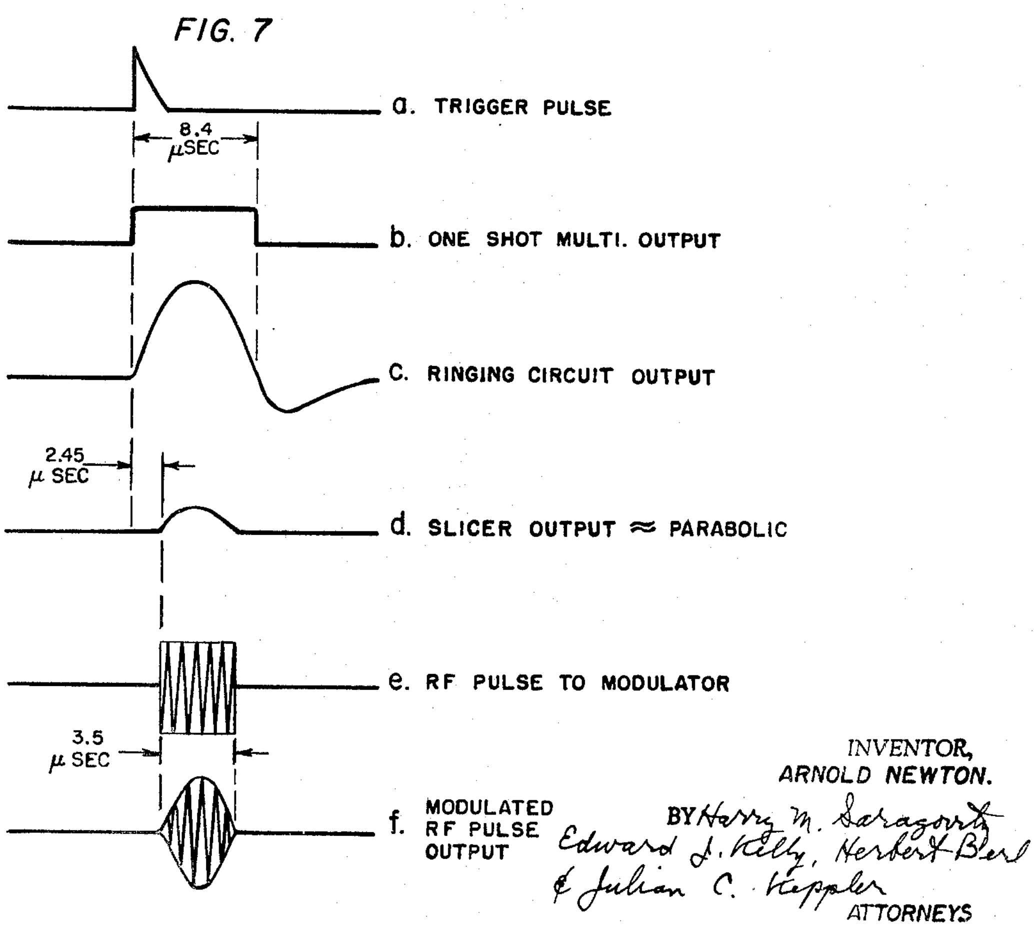
INVENTOR,
ARNOLD NEWTON.
BY Harry M. Saragovitz
Edward J. Kelly, Herbert Berl
& Julian C. Keppler
ATTORNEYS United States Patent Office 3,502,987

Patented Mar. 24, 1970

3,502,987
ANALOG FEEDBACK IMPLEMENTATION OF GAUSSIAN MODULATED SIGNALS

Arnold Newton, Forest Hills, N.Y., assignor, by mesne assignments, to the United States of America as represented by the Secretary of the Army Filed June 6, 1967, Ser. No. 644,462
Int. Cl. H03c *1/06;* H04b *1/04*
U.S. Cl. 325—159 1 Claim

ABSTRACT OF THE DISCLOSURE

An RF transmitter including Gaussian generating circuitry for extending the normal dynamic range of operation. RF signals are amplified through a series of amplifiers, shaped and then level controlled through a logarithmic feedback network. A Gaussian output is achieved by comparing the logarithm of the transmitted pulse envelope with a locally generated parabolic envelope. The feedback loop is used to force the difference toward zero with the resulting output a good approximation to Gaussian.

Background of the invention

The present invention relates generally to transmitting equipment and more particularly to a transmitter utilizing a logarithmic feedback system for effecting the generation of a Gaussian modulation signal over a wide dynamic range.

A considerable amount of effort has heretofore been expended in attempts to develop a transmitter capable of generating Gaussian output signals at high power levels. Attempts to effect such a transmitter have met with little success however, due in part to poor efficiency of the transmitting apparatus and also to the undesirable spectral characteristics resulting from a high level of distortion in the several components of the transmitter. The use of RF pulse shaping networks at the transmitter output has also failed to meet the desired criteria because of bandwidth and insertion loss consideration. The use of feedback systems has further introduced problems of insertion loss effects and the dynamic range of Gaussian response has been very limited in the desired high levels of power output.

Summary of the invention

The general purpose of this invention is to provide a feedback network in a transmitter for producing high power RF signals with approximately a Gaussian envelope. An added feature is the means of controlling the level of transmitted power as a function of the received signal level. To attain this, the present invention contemplates a unique feedback loop which includes a coupling arrangement from the output of the transmitter through a mixer, a logarithmic amplifier and a high gain operational summing amplifier to a modulating unit. The output of the logarithmic amplifier is summed with a parabolic input signal in a summing amplifier and the resulting signal is utilized in driving the modulator to produce Gaussian output signals over a wide dynamic range. The logarithmic amplifier also provides a D-C output which is compared with the AGC voltage in a summing amplifier 25 and used to control the level of transmitted power.

Brief description of the drawing

The exact nature of this invention will be readily apparent from consideration of the following specification relating to the annexed drawings in which:

FIGURE 5 illustrates a typical waveform of the clipper of FIGURE 1;

FIGURE 6 shows typical circuitry for performing the pulse shaping essential to produce the parabolic wave form required by the instant invention; and FIGURE 7 illustrates through a series of waveforms *a, b, c, d, e* and *f* the typical waveform characteristics necessary to produce the Gaussian output signal of the immediate invention.

Description of the preferred embodiment

Figure 1:
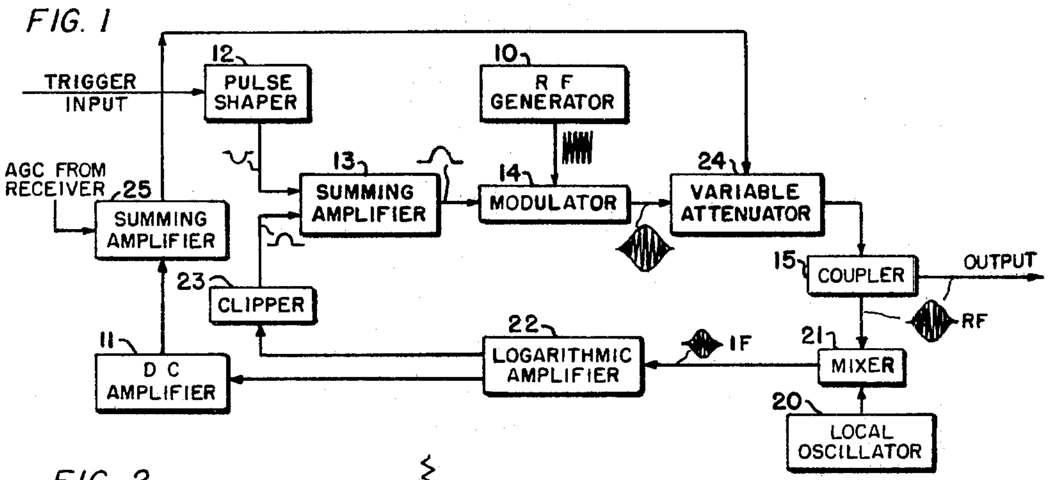
FIGURE 1 discloses one embodiment of a logarithmic feedback circuit integrally associated with a transmitter.
Figure 2:
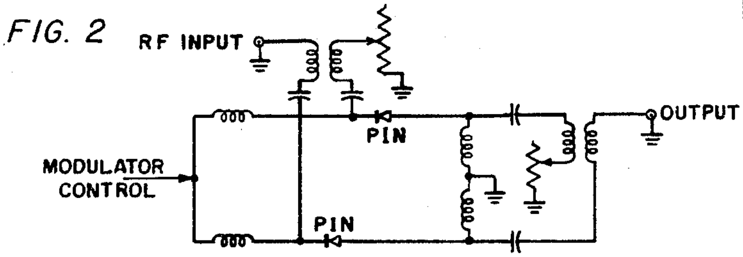
FIGURE 2 shows one type of modulator capable of performing in the manner desired in the embodiment of FIGURE 1.

Referring now to the drawings, FIGURE 1 discloses a logarithmic feedback circuit integrally associated with a transmitter. A radio frequency (RF) generator 10 provides a carrier wave input signal upon which an intelligence signal may be superimposed in the modulating unit 14, a typical unit of which is shown in FIG. 2. The intelligence signal represented by the initiating pulse is applied to modulator 14 through pulse shaper 12 and summing amplifier 13 to effect the shaping of the transmitter output pulses to a Gaussian envelope characteristic.

The output of modulator 14, a Gaussian shaped RF signal, is coupled to a transmitting antenna (not shown) for propagation through the surrounding media. A small fraction of the output (resulting in a small insertion loss) is coupled through coupler 15 to a linear detecting low insertion loss feedback loop. A prime function of the feedback system is to vary the transmitted power as a function of the path loss between the transmitter and some remote receiving set, so as to keep the power received approximately constant. In a particular embodiment, the level control will not start to operate until the signal is normally about 5 db above the minimum usable level. This is to keep errors in the level control feedback system from driving the transmitter signals below the minimum. The range of the level control circuit was 70 db in the particuar embodiment tested.

A resistive coupler was chosen for coupler 15 of the instant invention, as the coupling ratio would be independent of frequency, would be extremely simple, would introduce only a very small insertion loss and would provide a low impedance input for the mixer 21 in the feedback loop. The loss in transmitted power due to the presence of coupler 15 is less than 0.13 db. The resistors used in this particular application were of the film type, which are essentially resistive up to frequencies of several hundred megacycles.

Figure 3:
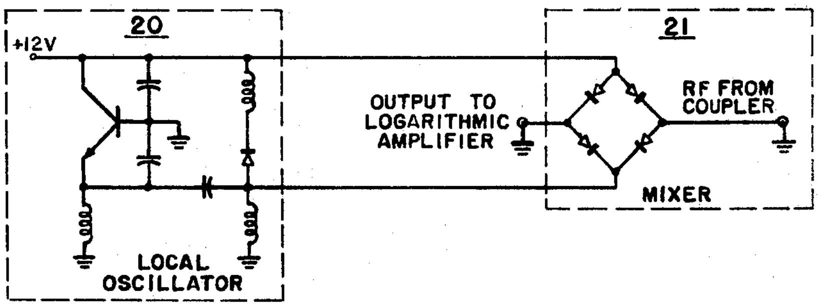
FIGURE 3 discloses a local oscillator and a mixer as utilized in FIGURE 1.

Mixer 21 is a simple diode bridge as shown in FIG. 3 and has the function of translating the RF pulses at the transmitter output to the passband of the logarithmic IF amplifier 22 which will be centered at 60 mc. The maximum signal level required at the output of the mixer is one milliwatt, which corresponds to the maximum input level of the logarithmic amplifier. A 10 db loss can be allowed in mixer 21, which means the maximum signal input power obtained from coupler 15 should be approximately 10 milliwatts. To insure that the mixer output amplitude will vary linearly with the input signal amplitude, an input of 50 milliwatts from local oscillator 20 is used, which is large compared to the signal. The mixer 21 makes use of a diode quad which is switched by local oscillator 20, while the signal and output are connected to the remaining corners of the bridge configuration, as shown in FIGURE 3. The transformer coupling the local oscillator to the mixer is broadband. For an input capacity of 5 pf. and input resistance of 100 ohms the bandwidth is about 300 mc. The mixer output is coupled to the logarithmic IF input, which will be tuned to 60 mc. and have a bandwidth of 25 mc.

Figure 4:
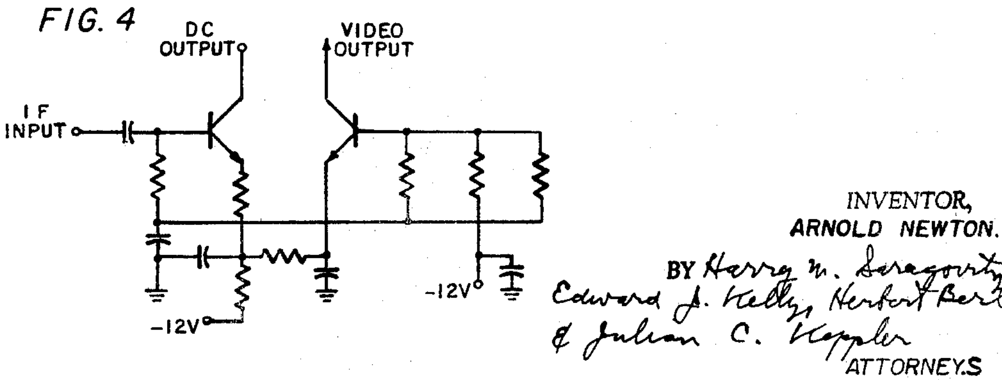
FIGURE 4 shows one stage of a logarithmic amplifier as used in the instant invention.

The logarithmic IF amplifier 22 is used for both the level control loop through DC amplifier 11 and the modulation loop through clipper 23. The logarithmic amplifier 22 is the successive detection type, a typical stage of which is shown in FIG. 4. This type of amplifier has been successfully built using thin film technique. The basic amplifier is RC coupled and has a bandwidth of approximately 100 mc. An input stage incorporating bandpass filtering is used to limit the bandwidth. The small signal gain needed is determined from the specifications of input and output dynamic range. Nine stages, each having a gain of 10 db, are satisfactory for this application. For an ideal logarithmic IF amplifier, the output voltage should be a linear function of the input signal in dbm. The actual logarithmic IF output curve will deviate from the ideal due to the fact that it is approximated by the sum of nine segments. The variation of the logarithmic characteristic from the ideal is typically less than ±.2 db in terms of input signal level, over the required operating conditions. The dynamic range of the logarithmic IF amplifier and the modulator should be chosen so that in the range from 0 db to 70 db in the level control circuit, the output pulse envelope should be Gaussian down to 20 db below the peak.

The logarithmic amplifier of FIG. 4 is shown to provide a pair of output signals. The first signal is a DC output ($-\ln A$) which is enhanced in amplifier 11 to provide the gain necessary to keep the error in the feedback loop adequately low. For the logarithmic amplifier 22 used in FIG. 4, a gain of 50 db will hold the error in the transmitted power to about ¼ db. When less than maximum attenuation is needed, the error due to the finite loop gain will be correspondingly smaller. The configuration of amplifier 11 is not critical but a transistorized amplifier is preferred in this embodiment. The second output signal from logarithmic amplifier 22 is a logarithmically shaped signal which is clipped in clipper 23 and fed to the summing amplifier 13. Clipper 23 may be any well known clipping device but in the immediate application, a simple diode clipper was used.

Clipper 23 serves to pass only a desired portion of the logarithmic output pulse as shown in FIG. 5. The magnitude of the pulse at the output of the logarithmic amplifier depends on the desired level of attenuation as determined by the level control provided by the variable attenuator 24. However, since the modulation envelope will have only a 30 db range over which it is Gaussian, only the upper 2.25 volts of this pulse will be meaningful for use in the modulation loop. For maximum attenuation, only the upper 1.1 volt will be meaningful. It is necessary that the pulse obtained from the logarithmic amplifier be constant in amplitude in order that the modulation loop may operate independently of the level control loop. This is true because the parabolic pulse from the pulse shaper 12 has a fixed amplitude.

The pulse shaper 12 produces shaped video pulses for the modulation loop when excited by trigger pulses. The required shape of the video pulse is parabolic, for a Gaussian output pulse. The parabolic pulse is closely approximated by using a section of a cosine pulse. Cosine pulses are generated in a ringing circuit as shown in FIGURE 6. A portion of the pulse is selected by a diode slicing circuit. The half amplitude width of the Gaussian pulse depends on the amplitude and the frequency of the ringing circuit output. The width of the pulse driving the ringing circuit is not critical as long as it exceeds the width of the parabolic segment.

A one shot multivibrator is used to stretch the trigger pulse to a nominal width of 8.4 μsec, half the period of the ringing. With the slicing level set at 2.3 volts below the peak, the maximum error of the sliced cosine waveform relative to a true parabola will be about 3.5%. See FIGS. 6 and 7.

For proper operation of the modulator loop it is necessary to have a delay between the trigger pulse applied to the pulse shaper and the RF burst applied to the modulator. The delay from the leading edge of the trigger pulse to the center of the RF pulse should be equal to ¼ period of the ringing circuit, which is 4.2 μsec. The delay from the leading edge of the trigger pulse to the leading edge of the RF pulse should be $$4.2-\frac{3.5}{2}=2.45\ \mu\text{sec}$$

The timing of the various waveforms in the modulation loop is shown in FIGURE 7.

The output of logarithmic amplifier 22 and the parabolic pulses from pulse shaper 12 are summed in operational amplifier 13 whose output drives modulator 14. What in essence is achieved in summing amplifier 13 is a comparison of the logarithm of the transmitted pulse envelope with a locally generated parabolic envelope. The feedback loop is used to force the difference between the two signals toward zero, thus providing an output from the amplifier which is a good approximation of a Gaussian fuction as seen by the waveforms of FIG. 1.

Even though the immediate invention is directed toward the generation of a Gaussian transmission signal over a wide range, sight must not be lost of the principal function of the transmitter to provide a power gain to amplify the small milliwatt input RF signal to a high power level for transmission. This power gain is provided by using amplifier stages between each of the stages shown in FIG. 1. The amplifiers have not been shown in the drawing in order to clarify the other functions of the transmitter.

It should be understood that the foregoing disclosure relates to only a preferred embodiment of the invention and that numerous modifications or alterations may be made therein without departing from the spirit and scope of the invention as set forth in the appended claim.

I claim:

1. In a radio frequency transmitter:
 - a source of radio frequency signals;
 - means for modulating said radio frequency signals;
 - output means coupled through an attenuator to said modulating means for receiving said modulated radio frequency signal and feeding same to a transmitting antenna;
 - a logarithmic feedback network including a coupling arrangement from the output means of the transmitter through a mixer, a logarithmic amplifier, a signal clipper, and a summing amplifier to said modulating means,
 - said mixer including a local oscillator for translating the radio frequency feedback signal to the passband of said logarithmic amplifier;
 - said logarithmic amplifier further providing a direct current signal which is coupled to said attenuator for controlling the level of transmitted power;
 - a source of parabolically shaped pulses coupled to said summing amplifier and summed with the clipped output signal of the logarithmic amplifier, whereby the resulting signal is utilized in driving said modulating means to produce Gassian output signals over a wide dynamic range.

(References on following page)

References Cited

UNITED STATES PATENTS

| | | | |
|---|---|---|---|
| 2,123,178 | 7/1938 | Bode | 325—159 |
| 2,689,299 | 9/1954 | Anderson | 328—27 |
| 2,862,187 | 11/1958 | Frost et al. | 332—371 |
| 3,141,134 | 7/1964 | Osborne et al. | 325—159 |
| 3,177,431 | 4/1965 | Ashley | 325—65 X |

| | | | |
|---|---|---|---|
| 3,200,336 | 8/1965 | Valakos et al. | 332—37 X |

ROBERT L. GRIFFIN, Primary Examiner

B. V. SAFOUREK, Assistant Examiner

U.S. Cl. X.R.

325—144, 164; 332—37